(12) United States Patent
Jos et al.

(10) Patent No.: US 10,404,610 B2
(45) Date of Patent: Sep. 3, 2019

(54) METHOD AND SYSTEM OF TRANSMITTING INDEPENDENT DATA FROM TRANSMITTERS TO RECEIVERS

(71) Applicant: SAMSUNG ELECTRONICS CO., LTD., Suwon-si (KR)

(72) Inventors: Sujit Jos, Banglore (IN); Chandrashekhar Thejaswi Ps, Banglore (IN); Chang Soon Park, Chungju-si (KR); Kiran Bynam, Jalahalli (IN); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 15/292,237

(22) Filed: Oct. 13, 2016

(65) Prior Publication Data

US 2018/0048583 A1 Feb. 15, 2018

(30) Foreign Application Priority Data

Oct. 13, 2015 (IN) ............................ 5484/CHE/2015
Aug. 9, 2016 (IN) ............................ 5484/CHE/2015
Sep. 26, 2016 (KR) ........................ 10-2016-0123091

(51) Int. Cl.
*H04L 12/801* (2013.01)
*H04L 1/00* (2006.01)
*H04W 84/04* (2009.01)

(52) U.S. Cl.
CPC ............... *H04L 47/34* (2013.01); *H04L 1/00* (2013.01); *H04L 1/0041* (2013.01);
(Continued)

(58) Field of Classification Search
CPC .................................................. H04L 25/4923
See application file for complete search history.

(56) References Cited

U.S. PATENT DOCUMENTS

2004/0062298 A1   4/2004   McDonough et al.
2004/0202256 A1   10/2004  Giannakis et al.
(Continued)

FOREIGN PATENT DOCUMENTS

WO    WO 2015/064945 A1   5/2015

OTHER PUBLICATIONS

"Method of Simultaneous Transmission to Coherent and Non-coherent Receivers using Ternary Sequences" Jos, Thejaswi, Bynam, Hong, Park and Choudhary Samsung 2014 (Year: 2014).*
(Continued)

*Primary Examiner* — Kevin M Cunningham
(74) *Attorney, Agent, or Firm* — NSIP Law

(57) ABSTRACT

Disclosed is a method and system to transmit independent data by at least two transmitters to corresponding at least two receivers. The method includes obtaining, at a first transmitter, a first ternary sequence from a first base ternary sequence corresponding to a first set of data-symbols, and obtaining, at a second transmitter, a second ternary sequence from a second base ternary sequence corresponding to a second set of data-symbols. The method also includes transmitting, from the first transmitter, the first ternary sequence to a first set of receivers associated with the first transmitter. The method transmits, from the second transmitter, the second ternary sequence to a second set of receivers associated with the second transmitter.

36 Claims, 11 Drawing Sheets

(52) U.S. Cl.
CPC .......... *H04L 1/0045* (2013.01); *H04L 1/0057* (2013.01); *H04W 84/04* (2013.01)

(56) References Cited

U.S. PATENT DOCUMENTS

| | | |
|---|---|---|
| 2007/0030837 A1 | 2/2007 | Wang et al. |
| 2010/0222076 A1 | 9/2010 | Poon et al. |
| 2013/0301750 A1* | 11/2013 | Chang ................ H04L 25/4917 375/286 |
| 2016/0261359 A1* | 9/2016 | Nair .................... H04J 13/0011 |
| 2016/0323056 A1* | 11/2016 | Park .................... H04J 13/0011 |

OTHER PUBLICATIONS

Extended European Search Report dated Feb. 22, 2017 in corresponding European Patent Application No. 16193717.2 (8 pages in English).

Chin, F. et al., "Impulse radio signaling for communication and ranging." IEEE P802.15 Working Group for Wireless Personal Area Networks (WPANs),Doc. No. IEEE 802.15-05-0231-07-004a, Jul. 2005 (39 pages, in English).

Lei, Z. et al., "Low Complexity 16-Ary Ternary Orthogonal Keying for UWB Communications," IEEE 64th Vehicular Technology Conference, VTC-2006, Fall 2006 (5 pages, in English).

\* cited by examiner

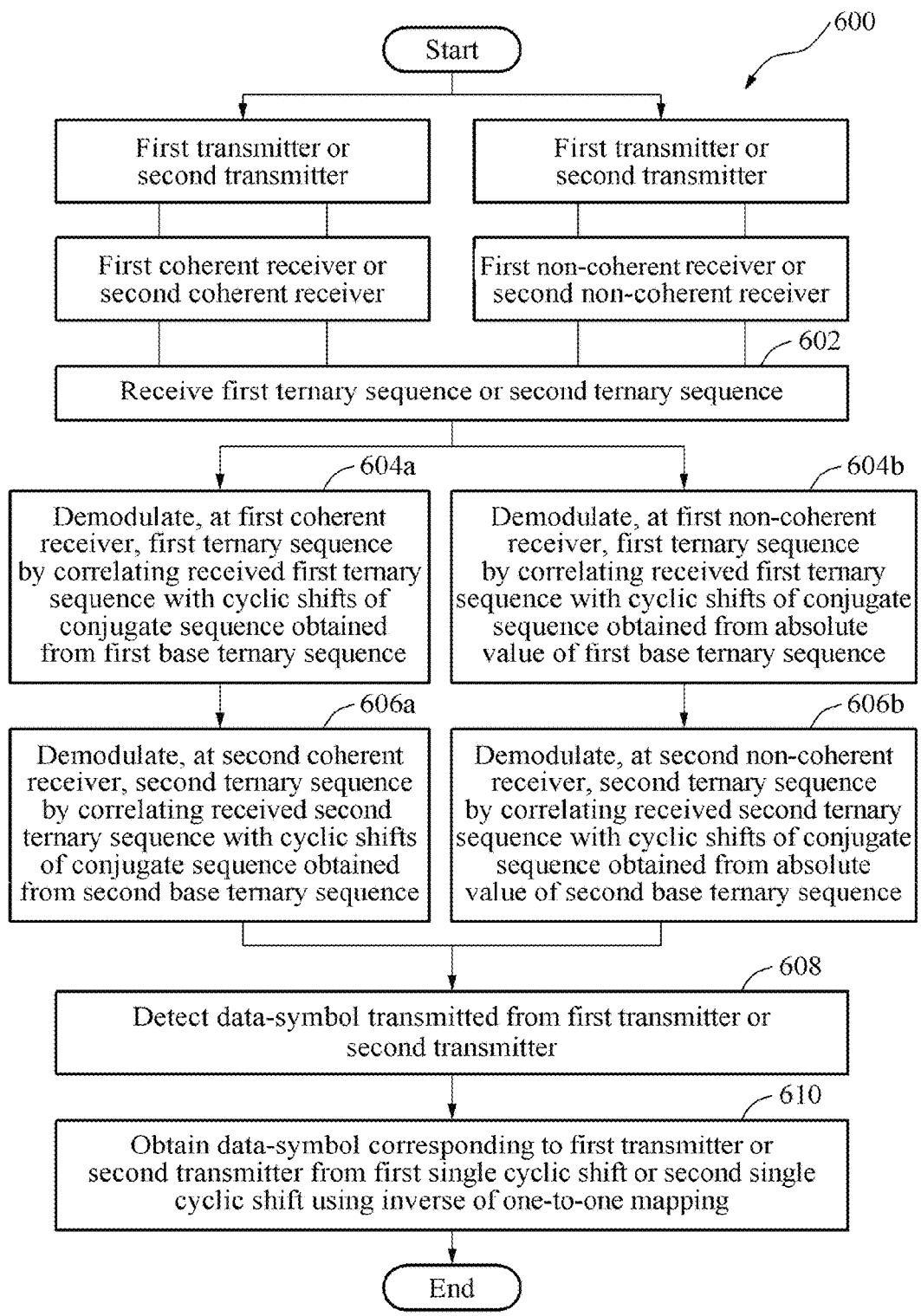

METHOD AND SYSTEM OF TRANSMITTING INDEPENDENT DATA FROM TRANSMITTERS TO RECEIVERS

CROSS-REFERENCE TO RELATED APPLICATIONS

This application claims the benefit under 35 U.S.C. § 119(a) of Indian Patent Application No. 5484/CHE/2015 filed on Oct. 13, 2015, and Indian Patent Application No. 5484/CHE/2015 filed on Aug. 9, 2016 in the Intellectual Property India, and claims the benefit under 35 U.S.C. § 119(a) of Korean Patent Application No. 10-2016-0123091 filed on Sep. 26, 2016 in the Korean Intellectual Property Office, the entire disclosures of which are incorporated herein by reference for all purposes.

BACKGROUND

1. Field

The following description relates to a communication system, and more particularly, to a mechanism of transmitting independent data from at least two transmitters to corresponding at least two receivers.

2. Description of Related Art

Short range low power wireless networks, such as Wireless Personal Area Network (WPAN) and Wireless Body Area Network (WBAN), employ wireless devices with a small form factor and are required to conserve their battery life. Therefore, the wireless devices need to operate at relatively low data rates and consume low power. These constraints defined for short range low power networks limit transmission to lower order modulation schemes, such as On-Off Keying (OOK), Frequency Shift Keying (FSK) and Binary Phase Shift Keying (BPSK).

The short range low power wireless networks employ both coherent and non-coherent forms of reception depending on the range/signal-to-noise ratio (SNR) requirements. In general, a transmission format of a signal transmitted from a transmitter is arranged to correspond to and be readable and be able to be processed by a corresponding receiver. For instance, for coherent reception over a binary alphabet (0, 1) as in OOK, a transmission signal is configured with the same binary alphabet (0, 1). Similarly, for transmission to a coherent receiver over a ternary alphabet $\{-1, 0, 1\}$, a transmission signal is configured with the ternary alphabet.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method to transmit independent data, the method including: obtaining, at a first transmitter, a first ternary sequence from a first base ternary sequence corresponding to a first set of data-symbols; obtaining, at a second transmitter, a second ternary sequence from a second base ternary sequence corresponding to a second set of data-symbols; transmitting, from the first transmitter, the first ternary sequence to a first set of receivers associated with the first transmitter; and transmitting, from the second transmitter, the second ternary sequence to a second set of receivers associated with the second transmitter.

The first base ternary sequence may include a predefined length and retrieved at the first transmitter.

The second base ternary sequence may include a predefined length and may be retrieved at the second transmitter.

The first ternary sequence may be obtained as a cyclic shift of the first base ternary sequence, and the cyclic shift may correspond to a data-symbol to be transmitted from the first transmitter and may be determined based on a one-to-one mapping.

The second ternary sequence may be obtained as a cyclic shift of the second base ternary sequence, and the cyclic shift may correspond to a data-symbol to be transmitted from the second transmitter and may be determined based on a one-to-one mapping.

The first base ternary sequence may be generated by: obtaining a first m-sequence of a period N–1; obtaining a first perfect ternary sequence from the first m-sequence; and appending a zero to a run of all zeros in the first perfect ternary sequence.

The second base ternary sequence may be generated by: obtaining a second m-sequence of a period N–1 as a decimation of a first m-sequence used to generate the first ternary sequence; obtaining a second perfect ternary sequence from the second m-sequence; and appending a zero to a run of all zeros in the second perfect ternary sequence.

The first perfect ternary sequence may be generated from the first m-sequence by: obtaining a preferred pair of m-sequences from the first m-sequence; obtaining a first correlation sequence of the preferred pair, the correlation sequence being obtained as a cross-correlation function between two m-sequences of the preferred pair; obtaining a first offset correlation sequence from the first correlation sequence; and generating the first perfect ternary sequence based on the first offset correlation sequence.

The second perfect ternary sequence may be generated from the second m-sequence by: obtaining a preferred pair of m-sequences from the second m-sequence; obtaining a second correlation sequence of the preferred pair, the correlation sequence being obtained as a cross-correlation function between two m-sequences of the preferred pair; obtaining a second offset correlation sequence from the second correlation sequence; and generating the second perfect ternary sequence based on the second offset correlation sequence.

The first set of receivers may include a first non-coherent receiver and a first coherent receiver associated with the first transmitter, and the second set of receivers may include a second non-coherent receiver and a second coherent receiver associated with the second transmitter.

The method may also include: receiving, at the first set of receivers, the first ternary sequence transmitted from the first transmitter; receiving, at the second set of receivers, the second ternary sequence transmitted from the second transmitter; demodulating, at the first coherent receiver, the first ternary sequence by correlating the first ternary sequence with all cyclic shifts of a conjugate sequence obtained from the first base ternary sequence; and demodulating, at the first non-coherent receiver, the first ternary sequence by correlating the first ternary sequence with all cyclic shifts of a conjugate sequence obtained from an absolute value of the first base ternary sequence.

The method may also include: demodulating, at the second coherent receiver, the second ternary sequence by correlating the second ternary sequence with all cyclic shifts of a conjugate sequence obtained from the second base ternary sequence; and demodulating, at the second non-coherent receiver, the second ternary sequence by correlating the second ternary sequence with all cyclic shifts of a conjugate sequence obtained from an absolute value of the second base ternary sequence.

The method may also include: detecting, at the first set of receivers, a data-symbol transmitted from the first transmitter by identifying a first single cyclic shift corresponding to a maximum correlation value among all cyclic shifts; detecting, at the second set of receivers, a data-symbol transmitted from the second transmitter by identifying a second single cyclic shift corresponding to the maximum correlation value among all cyclic shifts; obtaining, at the first set of receivers, each of the data-symbols corresponding to the first transmitter from the first single cyclic shift using an inverse of the one-to-one mapping; and obtaining, at the second set of receivers, each of the data-symbols corresponding to the second transmitter from the second single cyclic shift using the inverse of the one-to-one mapping.

The conjugate sequence may be obtained by replacing numeric '0' with numeric '1'.

The absolute value of the first base ternary sequence and an absolute value of the second base ternary sequence are obtained by replacing numeric '−1' of the first base ternary sequence and by replacing numeric '−1' of the second base ternary sequence with numeric '1'.

Data to be transmitted may be divided into the first set of data-symbols with a predefined length and the second set of data-symbols with the predefined length.

In accordance with a further embodiment, there is provided a system for transmitting independent data, including: a first transmitter configured to obtain a first ternary sequence from a first base ternary sequence corresponding to a first set of data-symbols; and a second transmitter configured to obtain a second ternary sequence from a second base ternary sequence corresponding to a second set of data-symbols, wherein the first transmitter may be further configured to transmit the first ternary sequence to a first set of receivers associated with the first transmitter, and the second transmitter may be further configured to transmit the second ternary sequence to a second set of receivers associated with the second transmitter.

The first base ternary sequence may include a predefined length retrieved at the first transmitter.

The second base ternary sequence may include the predefined length retrieved at the second transmitter.

The first ternary sequence may be obtained as a cyclic shift of the first base ternary sequence, and the cyclic shift corresponds to a data-symbol to be transmitted from the first transmitter and may be determined based on a one-to-one mapping.

The second ternary sequence may be obtained as a cyclic shift of the second base ternary sequence, and the cyclic shift corresponds to a data-symbol to be transmitted from the second transmitter and may be determined based on a one-to-one mapping.

The first base ternary sequence may be generated by obtaining a first m-sequence of a period N−1, obtaining a first perfect ternary sequence from the first m-sequence, and appending a zero to a run of all zeros in the first perfect ternary sequence.

The second base ternary sequence may be generated by obtaining a second m-sequence of a period N−1 as a decimation of a first m-sequence used to generate the first ternary sequence, obtaining a second perfect ternary sequence from the second m-sequence, and appending a zero to a run of all zeros in the second perfect ternary sequence.

The first perfect ternary sequence may be generated from the first m-sequence by obtaining a preferred pair of m-sequences from the first m-sequence, obtaining a first correlation sequence of the preferred pair, the correlation sequence being obtained as a cross-correlation function between two m-sequences of the preferred pair, obtaining a first offset correlation sequence from the first correlation sequence, and generating the first perfect ternary sequence based on the first offset correlation sequence.

The second perfect ternary sequence may be generated from the second m-sequence by obtaining a preferred pair of m-sequences from the second m-sequence, obtaining a second correlation sequence of the preferred pair, the correlation sequence being obtained as a cross-correlation function between two m-sequences of the preferred pair, obtaining a second offset correlation sequence from the second correlation sequence, and generating the second perfect ternary sequence based on the second offset correlation sequence.

The first set of receivers may include a first non-coherent receiver and a first coherent receiver associated with the first transmitter, and the second set of receivers may include a second non-coherent receiver and a second coherent receiver associated with the second transmitter.

The system may be further configured to receive, using the first set of receivers, the first ternary sequence transmitted from the first transmitter, receive, using the second set of receivers, the second ternary sequence transmitted from the second transmitter, demodulate, using the first coherent receiver, the first ternary sequence by correlating the first ternary sequence with all cyclic shifts of a conjugate sequence obtained from the first base ternary sequence, and demodulate, using the first non-coherent receiver, the first ternary sequence by correlating the first ternary sequence with all cyclic shifts of a conjugate sequence obtained from an absolute value of the first base ternary sequence.

The system may be further configured to: demodulate, using the second coherent receiver, the second ternary sequence by correlating the second ternary sequence with all cyclic shifts of a conjugate sequence obtained from the second base ternary sequence, and demodulate, using the second non-coherent receiver, the second ternary sequence by correlating the second ternary sequence with all cyclic shifts of a conjugate sequence obtained from an absolute value of the second base ternary sequence.

The system may be further configured to: detect, using the first set of receivers, a data-symbol transmitted from the first transmitter by identifying a first single cyclic shift corresponding to a maximum correlation value among all cyclic shifts, detect, using the second set of receivers, a data-symbol transmitted from the second transmitter by identifying a second single cyclic shift corresponding to the maximum correlation value among all cyclic shifts, obtain, using the first set of receivers, each of the data-symbols corresponding to the first transmitter from the first single cyclic shift, and obtain, using the second set of receivers, each of the data-symbols corresponding to the second transmitter from the second single cyclic shift using an inverse of the one-to-one mapping.

The conjugate sequence may be obtained by replacing numeric '0' with numeric '1'.

The absolute value of the first base ternary sequence and an absolute value of the second base ternary sequence are obtained by replacing numeric '−1' of the first base ternary sequence and by replacing numeric '−1' of the second base ternary sequence with numeric '1'.

Data to be transmitted may be divided into the first set of data-symbols with a predefined length and the second set of data-symbols with the predefined length.

In accordance with a further embodiment, there is provided a method to receive independent data, the method including: a first coherent receiver configured to demodulate a first ternary sequence received from a first transmitter by correlating the first ternary sequence with all cyclic shifts of a conjugate sequence obtained from a first base ternary sequence corresponding to a first set of data-symbols; a first non-coherent receiver configured to demodulate the first ternary sequence by correlating the first ternary sequence with all cyclic shifts of a conjugate sequence obtained from an absolute value of the first base ternary sequence; a second coherent receiver configured to demodulate a second ternary sequence received from a second transmitter by correlating the second ternary sequence with all cyclic shifts of a conjugate sequence obtained from a second base ternary sequence corresponding to a second set of data-symbols; and a second non-coherent receiver configured to demodulate the second ternary sequence by correlating the second ternary sequence with all cyclic shifts of a conjugate sequence obtained from an absolute value of the second base ternary sequence.

The first set of data-symbols may be detected by identifying a first single cyclic shift corresponding to a maximum correlation value among all of the cyclic shifts of the conjugate sequence obtained from the first base ternary sequence.

The second set of data-symbols may be detected by identifying a second single cyclic shift corresponding to a maximum correlation value among all of the cyclic shifts of the conjugate sequence obtained from the second base ternary sequence.

The first set of data-symbols may include a first predefined length and the second set of data-symbols may include a second predefined length.

Other features and aspects will be apparent from the following detailed description, the drawings, and the claims.

BRIEF DESCRIPTION OF THE DRAWINGS

FIG. 6 is a flowchart illustrating an example of a method to identify data represented by a received ternary sequence at a set of receivers, in accordance with an embodiment;

Figure 1:
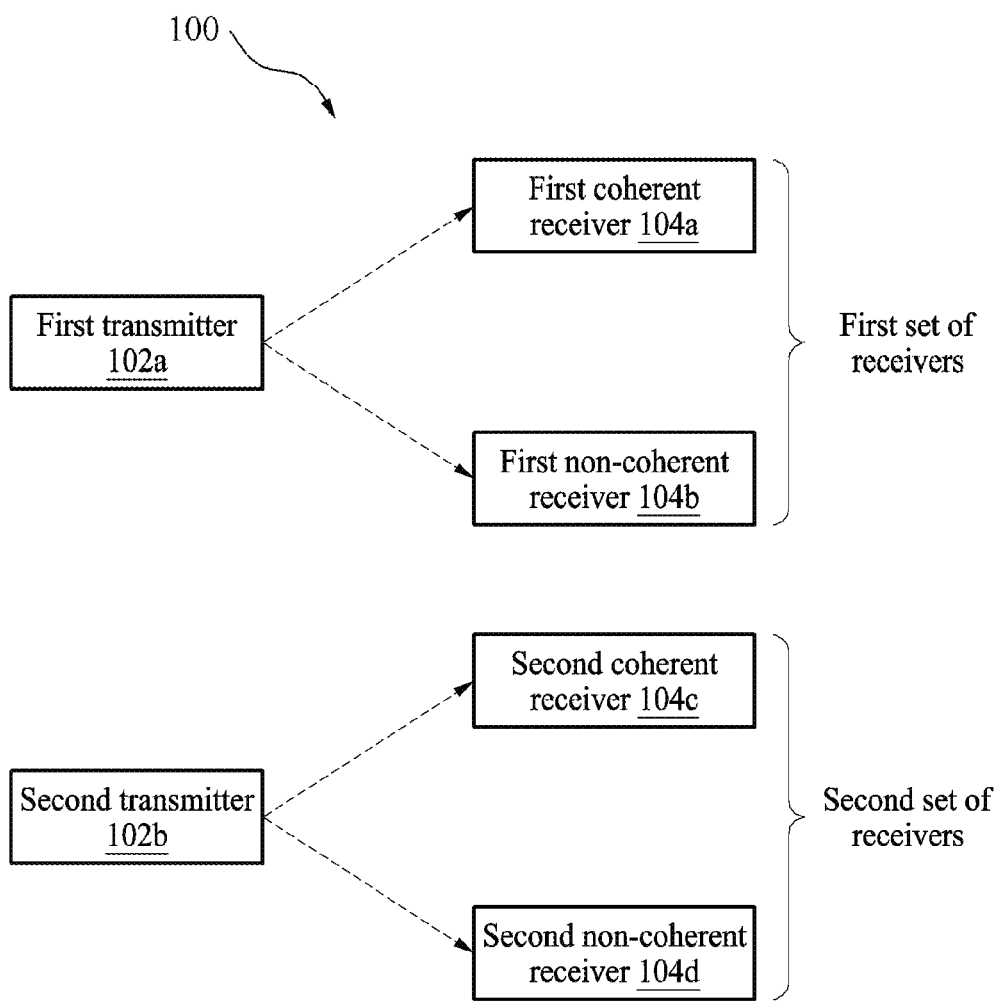
FIG. 1 is a block diagram illustrating a communication system, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure after an understanding of the disclosure of this application.

The examples herein and the various features and advantageous details thereof are explained more fully with reference to the non-limiting examples that are illustrated in the accompanying drawings and detailed in the following description. Descriptions of well-known components and processing techniques are omitted so as to not unnecessarily obscure the examples herein. Also, the various examples described herein are not necessarily mutually exclusive, as some examples can be combined with one or more other examples to form new examples. The term "or" as used herein refers to a non-exclusive or, unless otherwise indicated. The examples used herein are intended merely to facilitate an understanding of ways in which the examples herein can be practiced and to further enable to practice the examples herein. Accordingly, the examples should not be construed as limiting the scope of the examples herein.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In accordance with an embodiment, there is provided a method and corresponding apparatus that transmits independent data from at least two transmitters to corresponding at least two receivers. The method and corresponding apparatus include obtaining, at a first transmitter of the two transmitters, a first ternary sequence from a first base ternary sequence corresponding to a first set of data-symbols. The first set of data-symbols includes a predefined length. Further, the method and corresponding apparatus include obtaining, at a second transmitter of the two transmitters, a second ternary sequence from a second base ternary sequence corresponding to a second set of data-symbols. The second set of data-symbols includes the predefined length. Further, the method and corresponding apparatus include transmitting, at the first transmitter, the first ternary sequence to a first set of receivers. The first set of receivers is associated with the first transmitter. Furthermore, the method and corresponding apparatus include transmitting, at the second transmitter, the second ternary sequence to a second set of receivers. The second set of receivers is associated with the second transmitter.

Unlike the conventional system and method, in accordance with an embodiment, the method and corresponding apparatus utilize ternary sequences to support two independent communication links in a communication system. The method and corresponding apparatus are configured such that the interference between two transmitters should be as low as possible. The method and corresponding apparatus reduce the power consumption of transmitters and receivers in an electronic device, cost, and a complexity in a configuration of the transmitters and the receivers in the electronic device.

Hereinafter, the examples will be described with reference to FIGS. 1 through 9. Here, like reference numerals refer to like elements throughout.

FIG. 1 is a block diagram illustrating an example of a communication system, in accordance with an embodiment.

Referring to FIG. 1, a communication system 100 includes a first transmitter 102a, a second transmitter 102b, a first coherent receiver 104a, a second coherent receiver 104c, a first non-coherent receiver 104b, and a second non-coherent receiver 104d. The communication system 100 is configured to transmit independent data from transmitters to corresponding receivers, for example, the first coherent receiver 104a and the second non-coherent receiver 104d using the two transmitters, for example, the first transmitter 102a and the second transmitter 102b.

Data to be transmitted is divided into a first set of data-symbols with a predefined length and a second set of data-symbols with a predefined length. In one embodiment, the communication system 100 divides the data to be transmitted at the first transmitter 102, at the second transmitter 102b, or at a processor within the communication system 100. In accordance with an embodiment, the length of the first set of data-symbols and the length of the second set of data-symbols may be the same or may be different from each other. The first transmitter 102a is configured to obtain a first ternary sequence from a first base ternary sequence corresponding to the first set of data-symbols. In one example, the first base ternary sequence with a predefined length N is retrieved at the first transmitter 102a.

In one example, the first base ternary sequence is generated by obtaining a first (maximal length sequence) m-sequence of a period N−1, by obtaining a first perfect ternary sequence from the first m-sequence, and by appending a zero to a run of all zeros in the first perfect ternary sequence.

In one example, the first perfect ternary sequence is obtained by obtaining a preferred pair of m-sequences from the first m-sequence, and by obtaining a first correlation sequence from the preferred pair of m-sequences. Here, the correlation sequence is obtained as a cross-correlation function between two m-sequences of the preferred pair of m-sequences from the first m-sequence. Further, a first offset correlation sequence is obtained from the first correlation sequence. The first perfect ternary sequence is generated based on the first offset correlation sequence.

In one example, the first ternary sequence is obtained as a cyclic shift of the first base ternary sequence. The cyclic shift corresponds to a data-symbol to be transmitted from the first transmitter 102a, and the cyclic shift is determined based on a mapping procedure, for example, a one-to-one mapping.

The second transmitter 102b is configured to obtain a second ternary sequence from a second base ternary sequence corresponding to a second set of data-symbols. The second set of data-symbols has the predefined length. In an example, the second base ternary sequence with a predefined length N is retrieved at the second transmitter 102b.

In one example, the second base ternary sequence is generated by obtaining a second m-sequence of a period N−1 as a predefined decimation of the first m-sequence used to generate the first ternary sequence, by obtaining a second perfect ternary sequence from the second m-sequence, and by appending a zero to a run of all zeros in the second perfect ternary sequence.

In one example, the second perfect ternary sequence is obtained by obtaining a preferred pair of m-sequences from the second m-sequence, and by obtaining a second correlation sequence of the preferred pair. The correlation sequence is obtained as a cross-correlation function between two m-sequences of the preferred pair, which is obtained from the second m-sequence. Further, a second offset correlation sequence is obtained from the second correlation sequence. The second perfect ternary sequence is generated based on the second offset correlation sequence.

In one example, the second ternary sequence is obtained as a cyclic shift of the second base ternary sequence. The cyclic shift corresponds to a data-symbol to be transmitted from the second transmitter 102b and the cyclic shift is determined based on the one-to-one mapping.

The first transmitter 102a is configured to transmit the first ternary sequence to a first set of receivers. The first set of receivers is associated with the first transmitter 102a. The first set of receivers includes the first coherent receiver 104a and the first non-coherent receiver 104b. The second transmitter 102b is configured to transmit the second ternary sequence to a second set of receivers. The second set of receivers is associated with the second transmitter 102b. The second set of receivers includes the second coherent receiver 104c and the second non-coherent receiver 104d.

The first set of receivers is configured to receive the first ternary sequence transmitted from the first transmitter 102a. The second set of receivers is configured to receive the second ternary sequence transmitted from the second transmitter 102b. The first coherent receiver 104a is configured to demodulate the first ternary sequence by correlating the received first ternary sequence with all cyclic shifts of a conjugate sequence obtained from the first base ternary sequence. In one example, the conjugate sequence is obtained by replacing numeric '0' with numeric '−1'.

The first non-coherent receiver 104b is configured to demodulate the first ternary sequence by correlating the received first ternary sequence with all cyclic shifts of a conjugate sequence obtained from an absolute value of the first base ternary sequence.

The second coherent receiver 104c is configured to demodulate the second ternary sequence by correlating the received second ternary sequence with all cyclic shifts of a conjugate sequence obtained from the second base ternary sequence. The second non-coherent receiver 104d is configured to demodulate the second ternary sequence by correlating the received second ternary sequence with all cyclic shifts of a conjugate sequence obtained from an absolute value of the second base ternary sequence. In one example, the absolute value of the first base ternary sequence and the absolute value of the second base ternary sequence are obtained by replacing numeric '−1' of the first base ternary sequence and numeric '−1' of the second base ternary sequence with numeric '1'.

In one example, the first set of receivers is configured to detect at least one data-symbol transmitted from the first transmitter 102a by identifying a first single cyclic shift corresponding to a maximum correlation value among all cyclic shifts.

In one example, the second set of receivers is configured to detect at least one data-symbol transmitted from the second transmitter 102b by identifying a second single cyclic shift corresponding to a maximum correlation value among all cyclic shifts.

The first set of receivers is further configured to obtain each of the at least one data-symbol corresponding to the first transmitter 102a from the first single cyclic shift. The second set of receivers is further configured to obtain each of the at least one data-symbol corresponding to the second transmitter 102b from the second single cyclic shift. The first set of receivers and the second set of receivers are configured to map the first single cyclic shift and the second single cyclic shift to the corresponding data-symbols using an inverse of the one-to-one mapping that is applied to the respective transmitters.

The communication system 100 is designed such that each of the transmissions is reliably decoded at each coherent receiver, for example, the first coherent receiver 104a or the second coherent receiver 104c, and each non-coherent receiver, for example, the first non-coherent receiver 104b or the second non-coherent receiver 104d. The interference between the two transmissions decreases.

In an example in which information bits from a higher layer to be transmitted are packed into k bit blocks, where each block represents a data-symbol drawn from an M-ary alphabet, data-symbol S, is represented as Equation 1.

$$S=\{0,1,2,\ldots,M-1\},M=2^k \qquad \text{[Equation 1]}$$

Here, an information rate is represented using k bits/symbol. Each data-symbol is mapped to ternary sequences obtained from a ternary codeset. In this context, the ternary codeset includes a set of ternary sequences. Let $C^1$ denote a ternary codeset from which the ternary sequences are assigned to data-symbols corresponding to the first transmitter 102a and $C^2$ denote a ternary from which the ternary sequences are assigned to data-symbols corresponding to the second transmitter 102b. Thus, before transmission, each data-symbol from S is mapped to one of M possible sequences or codewords from each codeset. Each of the ternary codes $C^n$, n=1, 2 includes $M \geq 2^k$ sequences, each, of period N. The mapping is represented as Equation 2.

$$m \in S \Rightarrow c_m \in C^n, n=1,2 \qquad \text{[Equation 2]}$$

Although FIG. 1 illustrates an example of components of the communication system 100, it is to be understood that other examples may be implemented. In other examples, the communication system 100 may include a less or a greater number of structural components than those illustrated and described with respect to FIG. 1. Further, labels or names of the structural components are used only for illustrative purpose and do not limit the scope of the examples. One or more structural components may be combined together to perform the same or substantially similar function in the communication system 100.

Figure 2:
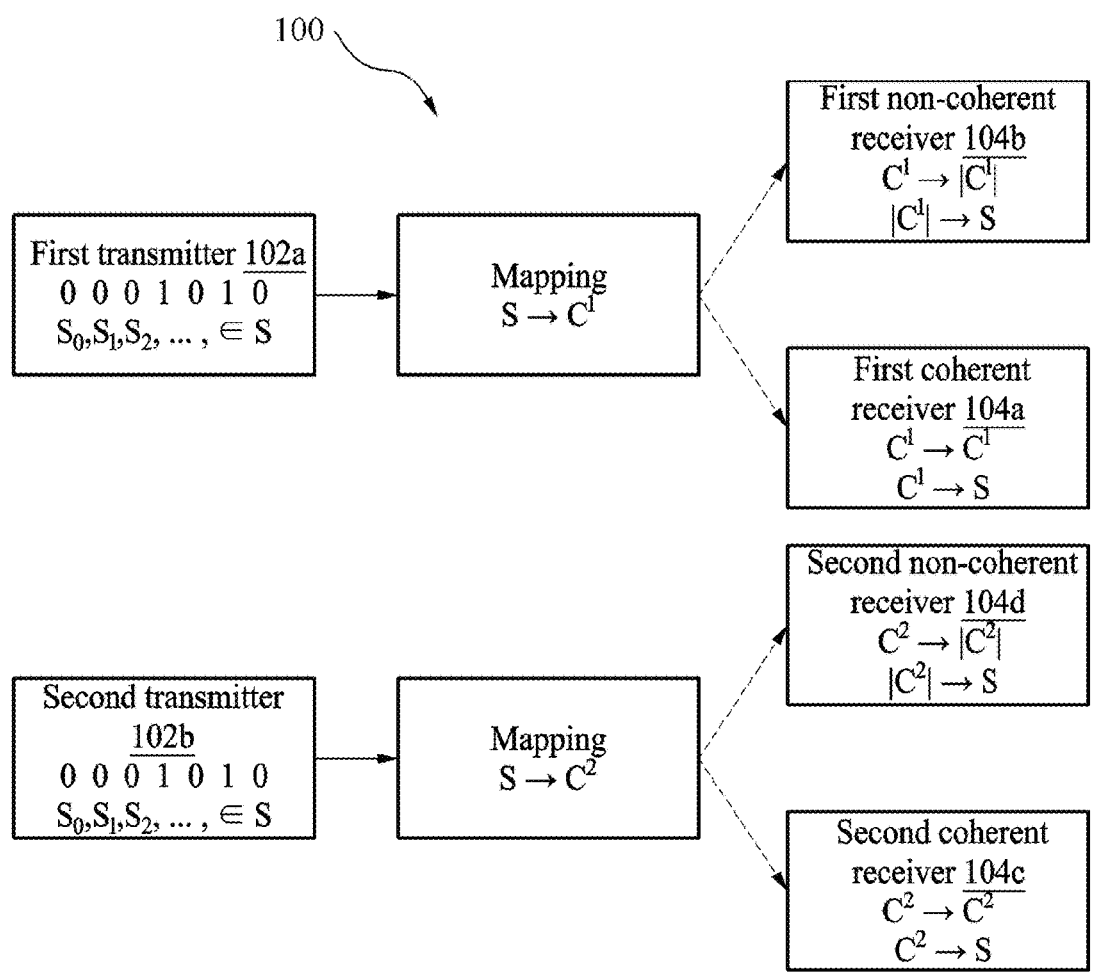
FIG. 2 is a diagram illustrating various operations of a transmitter, a coherent receiver, and a non-coherent receiver in the communication system, in accordance with an embodiment.

FIG. 2 illustrates an example of various operations at a transmitter, for example, the first transmitter 102a and the second transmitter 102b, a coherent receiver, for example, the first coherent receiver 104a and the second coherent receiver 104c. The communication system 100 also includes a non-coherent receiver, for example, the first non-coherent receiver 104b and the second non-coherent receiver 104d. Data-symbol mapping operations at various stages, for example, an operation at the first transmitter 102a or the second transmitter 102b, an operation at the first coherent receiver 104a or the second coherent receiver 104c, and an operation at the first non-coherent receiver 104b or the second non-coherent receiver 104d, in the communication system 100 will be described with reference to FIG. 2. Here, a transmitted ternary sequence is $c_m \in C^n$, n=1, 2 for any particular transmission from one of the first transmitter 102a and the second transmitter 102b.

Transmitted ternary sequences are received at all of the receivers, for example, the first coherent receiver 104a, the first non-coherent receiver 104b, the second coherent receiver 104c, and the second non-coherent receiver 104d, corresponding to the first transmitter 102a and the second transmitter 102b, respectively. Hereinafter, operations at the first coherent receiver 104a or the second coherent receiver 104c and the first non-coherent receiver 104b or the second non-coherent receiver 104d are described.

Coherent reception: Let $r=[r[0], \ldots, r[N-1]]^\dagger$ be a received sequence corrupted by additive white Gaussian noise (AWGN). A data-symbol estimate $\hat{m} \in S$ for coherent reception at the first coherent receiver 104a or the second coherent receiver 104c is given by a maximum likelihood (ML) detection, and expressed by Equation 3.

$$\hat{m} = \underset{m \in \{0,1,\ldots,M\}}{\mathrm{argmax}}\ r^\dagger \{c_m\}^b \qquad \text{[Equation 3]}$$

In Equation 3, $\{\ \}^b$ denotes an operator that replaces '0' in with '−1'. This helps in obtaining better correlation properties as discussed later.

Non-coherent reception: Estimates of transmitted ternary sequences are obtained at the first non-coherent receiver 104b or the second non-coherent receiver 104d and expressed by Equation 4.

$$\hat{m} = \underset{m \in \{0,1,\ldots,M\}}{\mathrm{argmax}}\ |r|^\dagger \{|c_m|\}^b \qquad \text{[Equation 4]}$$

In Equation 4, |r| represents an absolute value operation on the individual elements of r. A sequence $\{|c_m|\}^b$ is obtained by initially performing the absolute value operation on the individual elements $c_m$ and subsequently replacing '0' with '−1' in the resulting sequence.

Embodiment or configuration requirements of ternary codesets $c^n$, n=1, 2: Based on the operation at the first transmitter 102a or the second transmitter 102b, the operation at the first coherent receiver 104a or the second coherent receiver 104c, and the operation at the first non-coherent receiver 104b or the second non-coherent receiver 104d, the requirements on the ternary code design may be described as follows.

The coherent correlation for any pair of sequences drawn from the same codeset or different codesets is low or as low as possible.

The non-coherent correlation for any pair of sequences drawn from the same codeset or different codesets is low or as low as possible.

Here, the coherent correlation (CC) and the non-coherent correlation (NCC) are to be low or as low as possible. For $c_i, c_j$, a CC function $R_{c_i,c_j}^c(k)$ and an NCC function $R_{c_i,c_j}^{nc}(k)$ are defined as Equation 5 and Equation 6, respectively.

$$R_{c_i,c_j}^c(k) = \sum_{n=0}^{N-1} c_i[n]\{c_j[(n+k)\bmod N]\}^b \qquad \text{[Equation 5]}$$

$$R_{c_i,c_j}^{nc}(k) = \sum_{n=0}^{N-1} |c_i[n]|\{|c_j[(n+k)\bmod N]|\}^b \qquad \text{[Equation 6]}$$

Here, N≥M corresponds to a length/period of the ternary sequences. Further, $c_i, c_j$ corresponds to the same set $C^1$ or $C^2$, or $c_i \in C^1, c_j \in C^2$ and vice-versa. Also, in the definition of CC and NCC, the sequences $c_i$ and $c_j$ are interchangeably used.

Accordingly, configuring two ternary codesets $C^1$ and $C^2$ with good intra-set and inter-set correlation properties as defined by Equation 5 and Equation 6 may become an issue.

Embodiment or configuration of ternary codesets $C^n$, n=1, 2: The embodiment or configuration of ternary codesets $C^n$, n=1, 2 involves configuring two base ternary sequences with good autocorrelation properties individually and good cross-correlation properties collectively. The sets $C^1$ and $C^2$ are obtained as sets of cyclic shifts of the two base ternary sequences. The base ternary sequences are represented as x and y with elements represented by $\mu_x$ and $\mu_y$, respectively. The codes $C^1$ and $C^2$ are given by Equation 7 and Equation 8, respectively.

$$C^1 = \{c_i : c_i = L^g\{\mu_{x_i}\}, \forall g \in [0, N-1]\} \qquad \text{[Equation 7]}$$

$$C^2 = \{c_k : c_k = L^g\{\mu_{y_k}\}, \forall g \in [0, N-1]\} \qquad \text{[Equation 8]}$$

The sequence design issue lies in configuring the base ternary sequences $\mu_x$ and $\mu_y$, with low values with respect to phase autocorrelation individually and low correlation collectively. Hereinafter, the configuration of the ternary sequences $\mu_x$ and $\mu_y$, will be described. In an embodiment, the configuration is based on maximal length sequences or m-sequences.

An m-sequence is a binary sequence assuming values from set $\{0,1\}$, and defined for all periods $P=2^m-1$, m. Here, m denotes an integer. M-sequences may be generated using a Linear Feedback Shift Register (LFSR) with feedback polynomials selected as a primitive polynomial over the field GF(2). The M-sequence corresponds to the maximum period that is obtained from an LFSR of a given length.

Example of preferred pair of m-sequences:

For any pair of m-sequences x and y with period P, a cross-correlation function between x and y is defined for a lag k, as expressed by Equation 9.

$$\theta_{(x,y)}[k] = \sum_{n=0}^{P-1} (-1)^{(x_i \oplus y_{(i+k)\bmod P})}, 0 \le k < P \qquad \text{[Equation 9]}$$

Let $\theta_-((x,y)) = \{\theta_-((x,y))[0], \ldots, \theta_-((x,y))[P-1]\}$ be the sequence of cross-correlation functions for different lags.

A pair of m-sequences (x, y) with the period $P=2^n-1$ is defined as a preferred pair of m-sequences in a case of Equation 10.

$$\theta_{(x,y)}[k] \in \left\{-1, -1 \pm 2^{\frac{n+1}{2}}\right\}, \forall k \in \{0, \ldots, P-1\} \qquad \text{[Equation 10]}$$

In Equation 10, x denotes an m-sequence with period $P-2^n-1$ with elements represented as $x=[x_0, x_1, \ldots, x_{p-1}]$. Then, a sequence $y=x^{(d)}$, obtained as the d-decimation of the sequence x, together form a preferred pair of m-sequences if $d=2^m+1$ and the integer $$m \le \frac{k-1}{2}$$

such that GCD(m,n)=1.

The following example is considered for the configuration of the ternary sequences.

Example 1

In an embodiment, the m-sequences x and y form a preferred pair with period P=2^n−1. As described above, let x be the m-sequence from which the m-sequence y is derived. Let φ[x] be a mapping defined as Equation 11.

$$\Phi[\varepsilon] = \begin{cases} 0, \varepsilon = 0 \\ 1, \varepsilon \neq 0 \end{cases}$$ [Equation 11]

Then, Φ[x] maps the sequence $1+\theta_{(x,y)}$ to the original m-sequence x, as expressed by Equation 12.

$$\Phi[1+\theta(x,y)]=x$$ [Equation 12]

Elements of the m-sequence x are represented by Equation 13.

$$x_i = Tr(\gamma \alpha^i)$$ [Equation 13]

In Equation 13, Tr(ε) denotes a trace representation of element $\varepsilon \in GF(2^n)$ and is expressed by Equation 14.

$$Tr(\varepsilon) = \varepsilon + \varepsilon^2 + \varepsilon^{2^2} + \ldots + \varepsilon^{2^{n-1}}$$ [Equation 14]

Also, α denotes a primitive element in $GF(2^n)$. The element $\gamma \in GF^*(2^n)$ determines an initial phase of the m-sequence and $2^1-1$ phases corresponds to $\gamma \in GF^*(2^n)$ that is different by $2^n-1$. The initial phase is defined or fixed by letting γ=1 resulting in the characteristic phase of the m-sequence x and also the m-sequence y. The m-sequence y is obtained as the d-decimation of the m-sequence x. Here, $d=2^m+1$ and the integer m≤k−1/2 such that D(m, n)−1. Also, other decimations may yield three values of the cross-correlation function. The decimations may also be referred to as a predefined decimation as follows.

$$y_i = x_{di} = Tr(\alpha^{id})$$ [Equation 15]

The cross-correlation function of the m-sequences x and y at delay k is expressed by Equation 16.

$$\theta_{(x,y)}[k] = \sum_{n=0}^{P-1} (-1)^{\{Tr(\alpha^{id}) \oplus Tr(\alpha^i \alpha^k)\}}, 0 < k < P$$ [Equation 16]

Gold demonstrated that the cross-correlation function θ_((x,y))[k] at an arbitrary delay k depends on a $k^{th}$ element, for example, 〚x〛_k, of the m-sequence x, as expressed by Equation 17.

$$\theta_{(x,y)}[k] = \begin{cases} -1, x_k = 0 \\ -1 \pm 2^{\frac{n+1}{2}}, x_k = 1 \end{cases}$$ [Equation 17]

A result of adding '1' to $\theta_{(x,y)}[k], \forall k \in \{0,P-1\}$ is expressed by Equation 18.

$$1 + \theta_{(x,y)}[k] = \begin{cases} 0, x_k = 0 \\ \pm 2^{\frac{n+1}{2}}, x_k = 1 \end{cases}, \forall k \in \{0, 1, P-1\}$$ [Equation 18]

A result of mapping φ[ε] to (1+θ_((x,y))[k]) is expressed by Equation 19.

$$\Phi[1 + \theta_{(x,y)}[k]] = \begin{cases} 0, x_k = 0 \\ 1, x_k = 1 \end{cases}$$ [Equation 19]

Thus, the sequence φ[1+θ(x,y)[k]] is the same as the m-sequence x, and is expressed by Equation 20.

$$\Phi[1+\theta(x,y)]=x$$ [Equation 20]

Any pair of ideal two-level autocorrelation sequences θ and μ are defined by a property of sequence $\psi^{(\theta,\mu)}$ of which elements are expressed by Equation 21.

$$\psi_k^{(\theta,\mu)} = 1 = \theta(\theta,\mu)[k]$$ [Equation 21]

Equation 21 is a perfect non-binary sequence characterized by zero out-of-phase autocorrelation, which is expressed by Equation 22.

$$R(\psi_k^{(\theta,\mu)})[k] = \sum_{n=0}^{P-1} \psi_n^{(\theta,\mu)} \psi_{n+k}^{(\theta,\mu)} = \begin{cases} |\psi_k^{(\theta,\mu)}|, n = 0 \\ 0, 0 < n < P \end{cases},$$ [Equation 22]

In Equation 22, $|\psi_k^{(\theta,\mu)}|$ denotes a norm of a sequence obtained as a dot product $\langle \psi^{(\theta,\mu)} \cdot \psi^{(\theta,\mu)} \rangle$.

Figure 3:
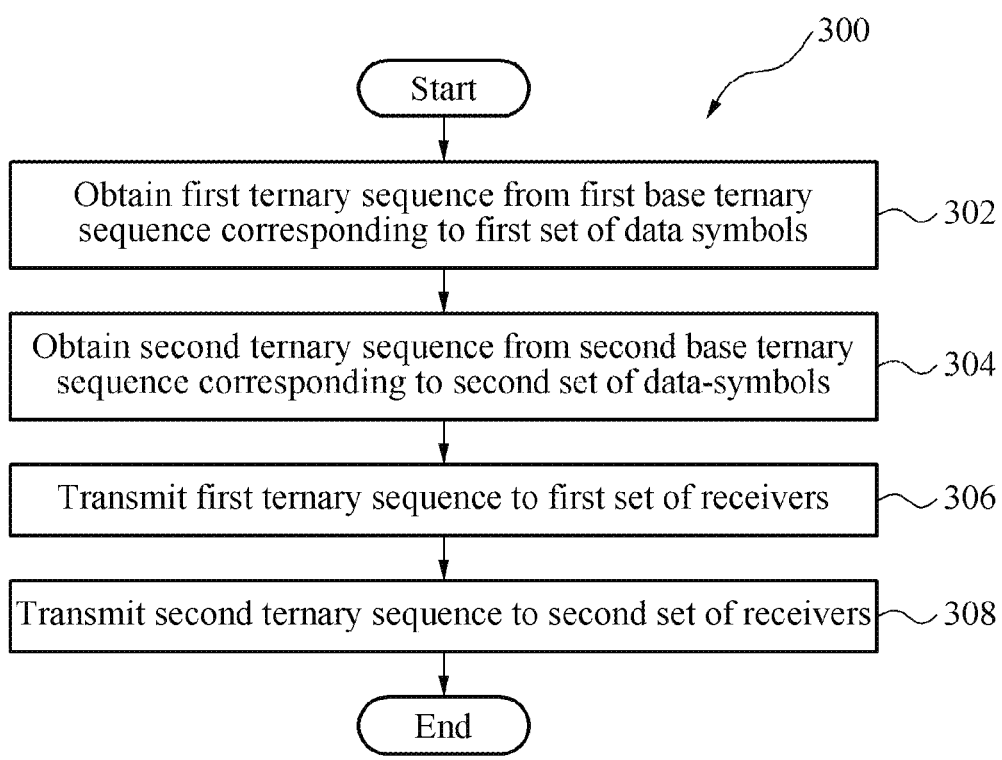
FIG. 3 is a flowchart illustrating an example of a method transmitting independent data by at least two transmitters to corresponding at least two receivers, in accordance with an embodiment.

FIG. 3 is a flowchart illustrating an example of a method 300 to transmit independent data from at least two transmitters to corresponding at least two receivers, in accordance with an embodiment.

Referring to FIG. 3, in operation 302, the method 300 includes obtaining a first ternary sequence from a first base ternary sequence corresponding to a first set of data-symbols. In one example, the method 300 configures the first transmitter 102a to obtain the first ternary sequence from the first base ternary sequence corresponding to the first set of data-symbols. The first set of data-symbols has a predefined length.

In operation 304, the method 300 includes obtaining a second ternary sequence from a second base ternary sequence corresponding to a second set of data-symbols. The second set of data-symbols has the predefined length. In one example, the method 300 enables the second transmitter 102b to obtain the second ternary sequence from the second base ternary sequence, corresponding to the second set of data-symbols. In operation 306, the method 300 includes transmitting the first ternary sequence to a first set of receivers. The first set of receivers is associated with the first transmitter 102a. In operation 308, the method 300 includes transmitting the second ternary sequence to a second set of receivers. The second set of receivers is associated with or corresponds to the second transmitter 102b. In one example, the method 300 enables the second transmitter 102b to transmit the second ternary sequence to the second set of receivers.

The various actions, functions, blocks, operations illustrated and described with respect to the method 300 may be performed in order presented, in different order, or simultaneously. Further, in some examples, some of the actions, functions, blocks, operations, and the like may be omitted, added, modified, skipped, and the like, without departing from the scope of the examples.

Figure 4A:
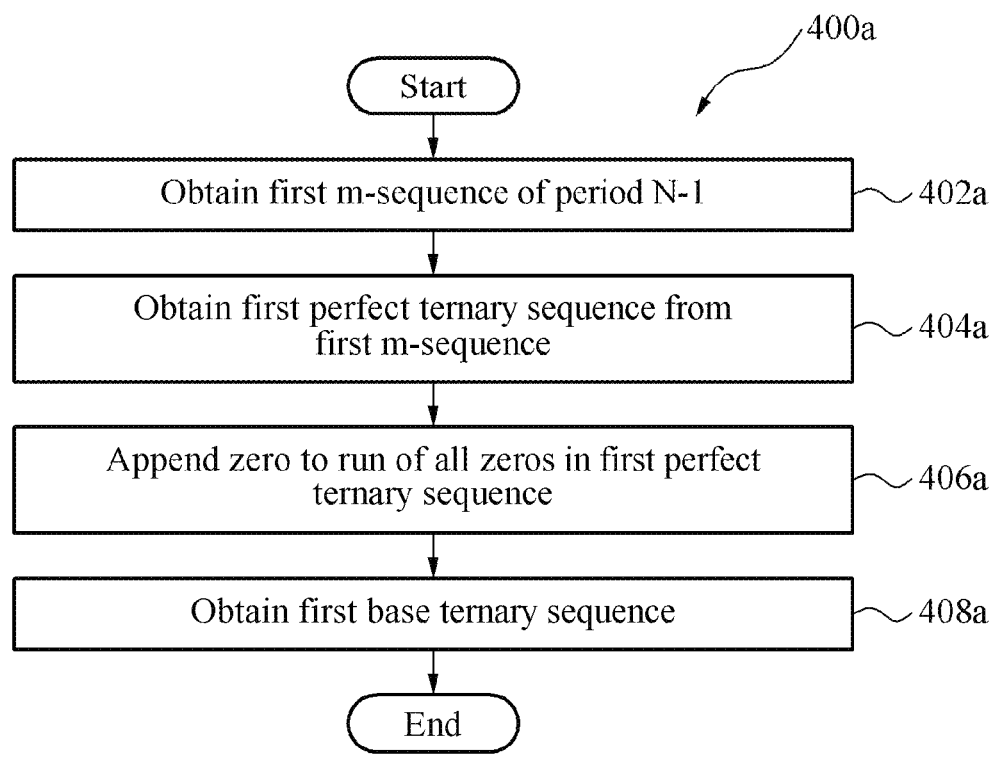
FIG. 4A is a flowchart illustrating an example of a method to obtain a first base ternary sequence, in accordance with an embodiment.

FIG. 4A is a flowchart illustrating an example of a method 400a to obtain a first base ternary sequence, in accordance with an embodiment.

Referring to FIG. 4A, in operation 402a, the method 400a includes obtaining a first m-sequence of a period N−1.

In operation 404a, the method 400a includes obtaining a first perfect ternary sequence from the first m-sequence. In operation 406a, the method 400a includes appending a zero to a run of all zeros in the first perfect ternary sequence. That is, a new zero is appended to the run of all zeros in the first perfect ternary sequence. For example, a new zero is appended at a front of the run of all zeros in the first perfect ternary sequence. As another example, a new zero is appended at rear of the run of all zeros in the first perfect ternary sequence. In an alternative example, a new zero is inserted between the run of all zeros in the first perfect ternary sequence. For example, upon the first perfect ternary sequence being "001111", the appending the zero to the run of all zeros in the first perfect ternary sequence is "10001111".

In operation 408a, the method 400a includes obtaining the first base ternary sequence. The first transmitter 102a and the second transmitter 102b retrieve the respective base ternary sequences.

The various actions, functions, blocks, operations, and the like in the method 400a may be performed in order presented, in different order, or simultaneously. Further, in some examples, some of the actions, functions, blocks, operations, and the like may be omitted, added, modified, skipped, and the like without departing from the scope of the examples.

Figure 4B:
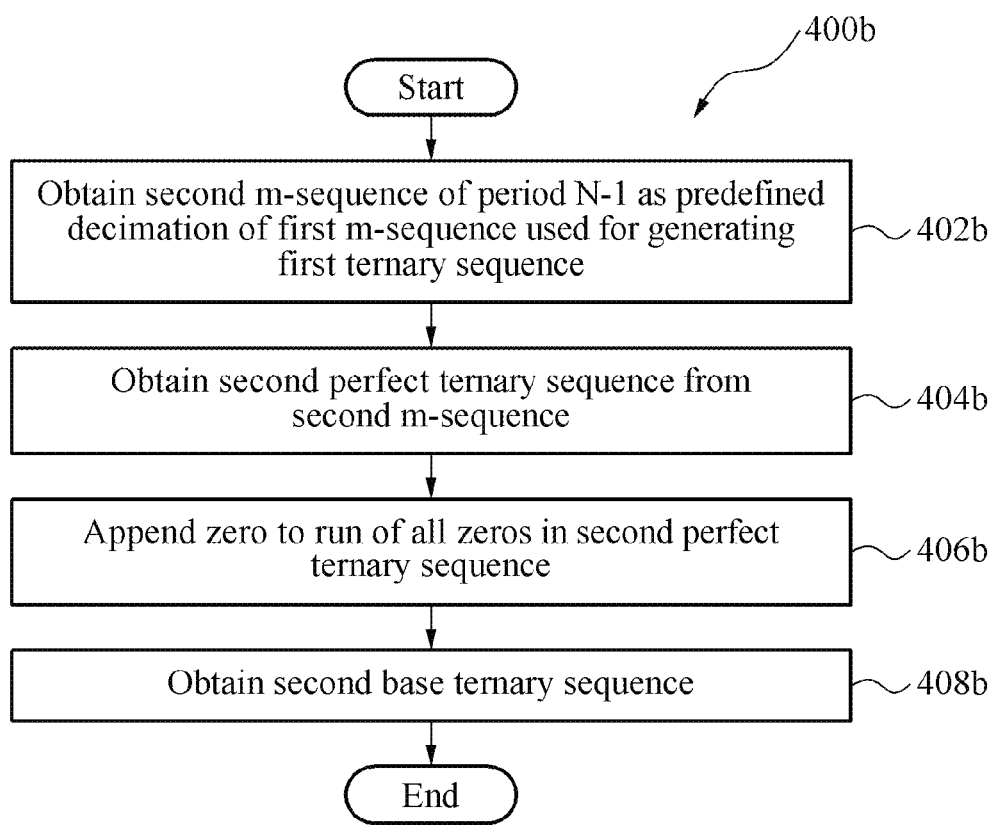
FIG. 4B is a flowchart illustrating an example of a method to obtain a second base ternary sequence, in accordance with an embodiment.

FIG. 4B is a flowchart illustrating an example of a method 400b to obtain a second base ternary sequence, in accordance with an embodiment.

Referring to FIG. 4B, in operation 402b, the method 400b includes obtaining a second m-sequence of a period N−1 as a predefined decimation of the first m-sequence used to generate the first ternary sequence.

In operation 404b, the method 400b includes obtaining a second perfect ternary sequence from the second m-sequence. That is, a new zero is appended to the run of all zeros in the second perfect ternary sequence. For example, a new zero is appended at front of the run of all zeros in the second perfect ternary sequence. As another example, a new zero is appended at rear of the run of all zeros in the second perfect ternary sequence. In an alternative example, a new zero is inserted between the run of all zeros in the second perfect ternary sequence.

In operation 406b, the method 400b includes appending a zero to a run of all zeros in the second perfect ternary sequence. For example, if the second perfect ternary sequence is "1100111", the appending the zero to the run of all zeros in the second perfect ternary sequence is "110001111". In operation 408b, the method 400b includes obtaining the second base ternary sequence.

The various actions, functions, blocks, operations, and the like in the method 400b may be performed in order presented, in different order, or simultaneously. Further, in some examples, some of the actions, functions, blocks, operations, and the like may be omitted, added, modified, skipped, and the like without departing from the scope of the examples.

Figure 5A:
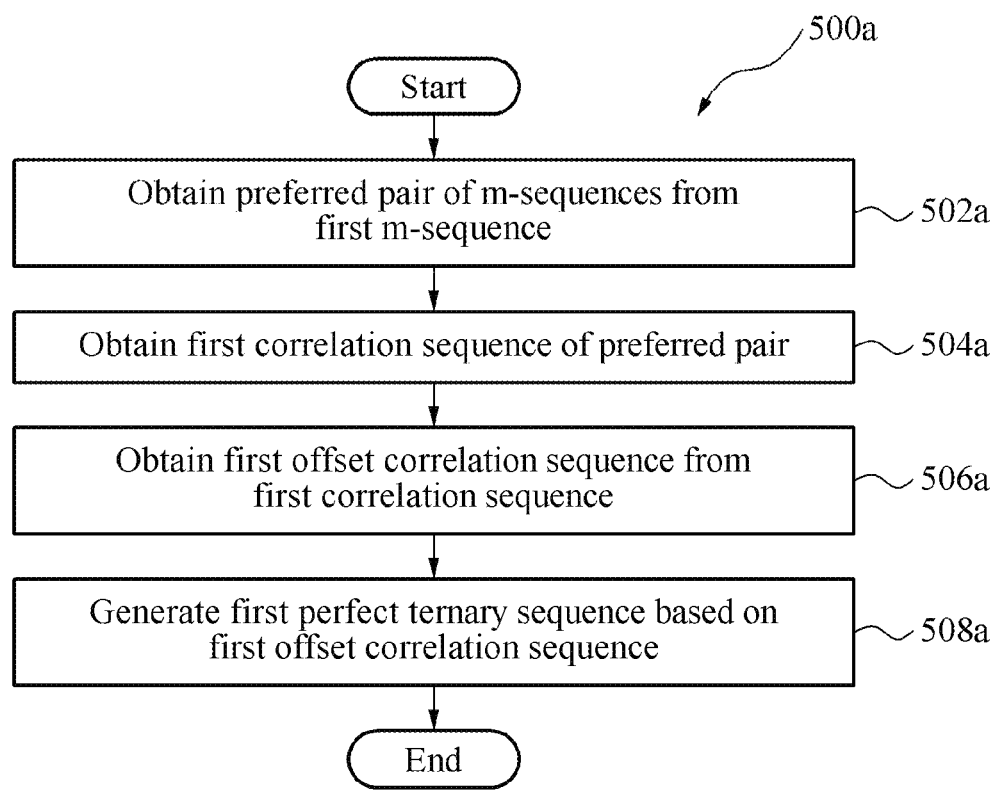
FIG. 5A is a flowchart illustrating an example of a method to generate a first perfect ternary sequence, in accordance with an embodiment.

FIG. 5A is a flowchart illustrating an example of a method 500a to generate a first perfect ternary sequence, in accordance with an embodiment.

Referring to FIG. 5A, in operation 502a, the method 500a includes obtaining a preferred pair of m-sequences from the first m-sequence. In operation 504a, the method 500a includes obtaining a first correlation sequence of the preferred pair. The correlation sequence is obtained as a cross-correlation function between two m-sequences of the preferred pair. In operation 506a, the method 500a includes obtaining a first offset correlation sequence from the first correlation sequence. In operation 508a, the method 500a includes generating the first perfect ternary sequence based on the first offset correlation sequence.

The various actions, functions, blocks, operations, and the like in the method 500a may be performed in order presented, in different order, or simultaneously. Further, in some examples, some of the actions, functions, blocks, operations, and the like may be omitted, added, modified, skipped, and the like without departing from the scope of the examples.

Figure 5B:
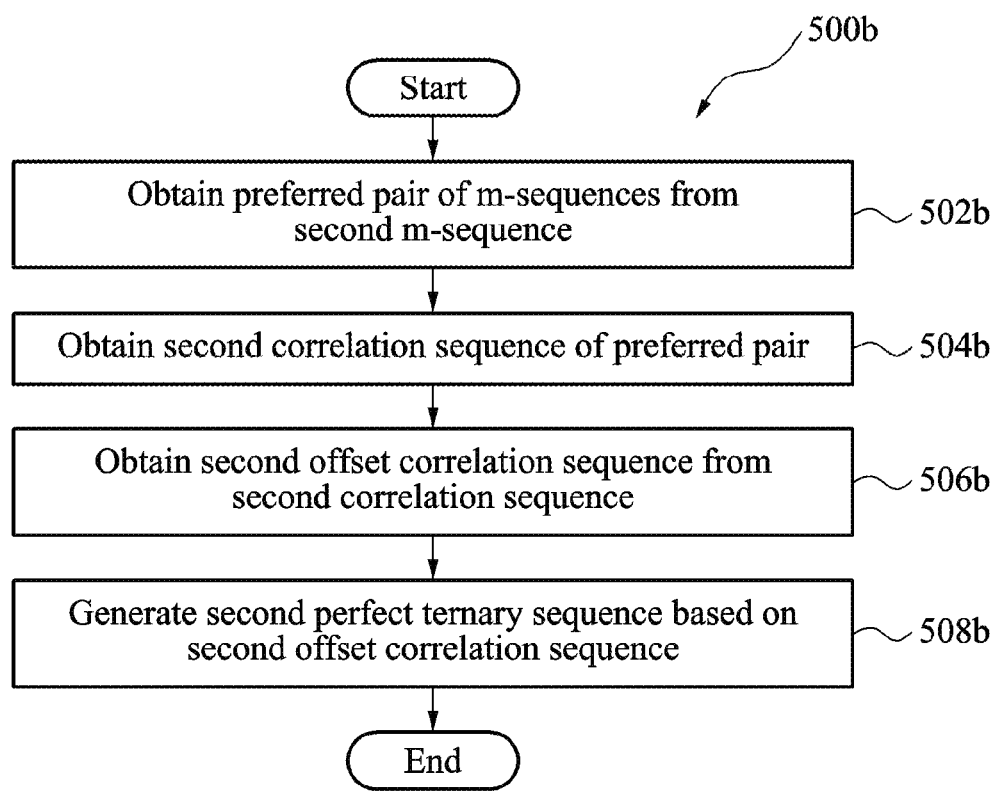
FIG. 5B is a flowchart illustrating an example of a method to generate a second perfect ternary sequence, in accordance with an embodiment.

FIG. 5B is a flowchart illustrating an example of a method 500b to generate a second perfect ternary sequence, in accordance with an embodiment.

Referring to FIG. 5B, in operation 502b, the method 500b includes obtaining a preferred pair of m-sequences from the second m-sequence. In operation 504b, the method 500b includes obtaining a second correlation sequence of the preferred pair. The correlation sequence is obtained as a cross-correlation function between two m-sequences of the preferred pair.

In operation 506b, the method 500b includes obtaining a second offset correlation sequence from the second correlation sequence. In operation 508b, the method 500b includes generating the second perfect ternary sequence based on the second offset correlation sequence.

The method 500b may be employed to generate a perfect ternary sequence with the period of the form P=2^n−1, using preferred pairs of m-sequences. Let x corresponding to an m-sequence of period P, and y corresponding to an m-sequence obtained from the m-sequence y, using the decimation described earlier form the preferred pair, i.e., (x, y). Using Example 1, elements of a cross-correlation sequence include values as demonstrated in Equation 23.

$$\theta(x, y)[k] \in \left\{-1, -1 \pm 2^{\frac{n+1}{2}}\right\} \qquad \text{[Equation 23]}$$

Also, the sequence $\psi^{(x,y)} = \theta(x,y)+1$ obtained by adding '1' to each element of the cross-correlation function $\theta(x,y)$ is a perfect sequence over a non-binary alphabet. The elements of $\psi^{(x,y)}$ assume values as shown in Equation 24.

$$\psi_k^{(x,y)} \in \left\{0, \pm 2^{\frac{n+1}{2}}\right\} \qquad \text{[Equation 24]}$$

By dividing the sequence $$\psi^{(x,y)} = 1 + \theta(x, y) \text{ by } 2^{\frac{n+1}{2}},$$

a perfect ternary sequence $\Lambda(x,y)$ with elements is generated from $\{0,\pm 1\}$. Such perfect ternary sequence $\Lambda(x,y)$ is represented by Equation 25.

$$\Phi[\psi^{(x,y)}] = |\theta(x,y)| \qquad \text{[Equation 25]}$$

Here, $|\Lambda(x,y)|$ is obtained by replacing each element of the sequence $\theta(x,y)$ with a corresponding absolute value, and, from Example 1, is shown in Equation 26.

$$|\Lambda(x,y)| = x \qquad \text{[Equation 26]}$$

Accordingly, the m-sequence x arrives at a ternary sequence with perfect correlation. Furthermore, zero and non-zero positions of the ternary sequence identify the starting m-sequence x. Hereinafter, the perfect ternary sequence θ(x,y) may also be referred as $v_x$ for notational convenience.

Hereinafter, design methodology will be described.

In accordance with an embodiment, the sequence design uses an m-sequence of period $P=2^n-1$ to produce a pair of ternary sequences of period $N=2^n$. Balanced sequences are generated that include the same number of zero and non-zero elements. In accordance with an example:

The m-sequence x of period $P=N-1=2^n-1$ is obtained.

The perfect ternary sequence $v_x$ of period P is obtained from the m-sequence x using procedure A.

The m-sequence y with elements $y_i = x_{di} = \mathrm{Tr}(\alpha^{id})$ is obtained. Here, $d=2^m+1$ and the integer $$m \leq \frac{k-1}{2}$$

such that GCD(m,n)=1.

The perfect ternary sequence $v_y$ of the period P is obtained from the m-sequence y using the procedure A.

In one example, '0' is appended to the run of all zeros of length $\log_2 N - 1$ in each of the ternary sequences $v_x$ and $v_y$ to obtain a pair of ternary sequences $(\mu_x, \mu_y)$.

Through this, two ternary sequences $\mu_x$ and $\mu_y$ with low values of cross-correlation across both binary alphabet {0, 1} and ternary alphabet {0, ±1} are obtained.

FIG. 6 is a flowchart illustrating an example of a method 600 to identify data represented by a received ternary sequence at a set of receivers, in accordance with an embodiment.

Referring to FIG. 6, in operation 602, the method 600 includes receiving a first ternary sequence or a second ternary sequence transmitted from the first transmitter 102a or the second transmitter 102b, respectively. In one example, the method 600 enables a first set of receivers or a second set of receivers to receive the first ternary sequence or the second ternary sequence transmitted from the first transmitter 102a or the second transmitter 102b, respectively.

In operation 604a, the method 600 includes demodulating the first ternary sequence by correlating the received first ternary sequence with all cyclic shifts of a conjugate sequence obtained from the first base ternary sequence. In one example, the method 600 enables the first coherent receiver 104a to demodulate the first ternary sequence by correlating the received first ternary sequence with all cyclic shifts of the conjugate sequence obtained from the first base ternary sequence. In one example, the conjugate sequence is obtained by replacing numeric '0' with numeric '−1'.

In operation 604b, the method 600 includes demodulating the first ternary sequence by correlating the received first ternary sequence with all cyclic shifts of a conjugate sequence obtained from an absolute value of the first base ternary sequence. In one example, the method 600 enables the first non-coherent receiver 104b to demodulate the first ternary sequence by correlating the received first ternary sequence with all cyclic shifts of the conjugate sequence obtained from the absolute value of the first base ternary sequence.

In operation 606a, the method 600 includes demodulating the second ternary sequence by correlating the received second ternary sequence with all cyclic shifts of a conjugate sequence, which is obtained from the second base ternary sequence. In one example, the method 600 enables the second coherent receiver 104c to demodulate the second ternary sequence by correlating the received second ternary sequence with all cyclic shifts of the conjugate sequence obtained from the second base ternary sequence.

In operation 606b, the method 600 includes demodulating the second ternary sequence by correlating the received second ternary sequence with all cyclic shifts of a conjugate sequence obtained from an absolute value of the second base ternary sequence. In one example, the method 600 enables the second non-coherent receiver 104d to demodulate the second ternary sequence by correlating the received second ternary sequence with all cyclic shifts of conjugate sequence obtained from the absolute value of the second base ternary sequence.

In an example, the absolute value of the first base ternary sequence and the absolute value of the second base ternary sequence are obtained by replacing numeric '−1' of the first base ternary sequence and numeric '−1' of the second base ternary sequence with numeric '1'.

In operation 608, the method 600 includes detecting a data-symbol transmitted from the first transmitter 102a or the second transmitter 102b. In one example, the method 600 allows the first set of receivers to detect the data-symbol transmitted from the first transmitter 102a by identifying a first single cyclic shift corresponding to a maximum correlation value among all cyclic shifts. In one example, the method 600 enables the second set of receivers to detect the data-symbol transmitted from the second transmitter 102b by identifying a second single cyclic shift corresponding to a maximum correlation value among all cyclic shifts.

In operation 610, the method 600 includes obtaining the data-symbol corresponding to the first transmitter 102a or the second transmitter 102b from the first single cyclic shift or the second single cyclic shift using an inverse of the one-to-one mapping. In one example, the method 600 enables the first set of receivers to obtain the data-symbol corresponding to the first transmitter 102a from the first single cyclic shift using the inverse of the one-to-one mapping. In one example, the method 600 enables the second set of receivers to obtain the data-symbol corresponding to the second transmitter 102b from the second single cyclic shift using the inverse of the one-to-one mapping.

The various actions, functions, blocks, operations, and the like in the method 600 may be performed in order presented, in different order, or simultaneously. Further, in some examples, some of the actions, functions, blocks, operations, and the like may be omitted, added, modified, skipped, and the like without departing from the scope of the examples.

Figure 7A:
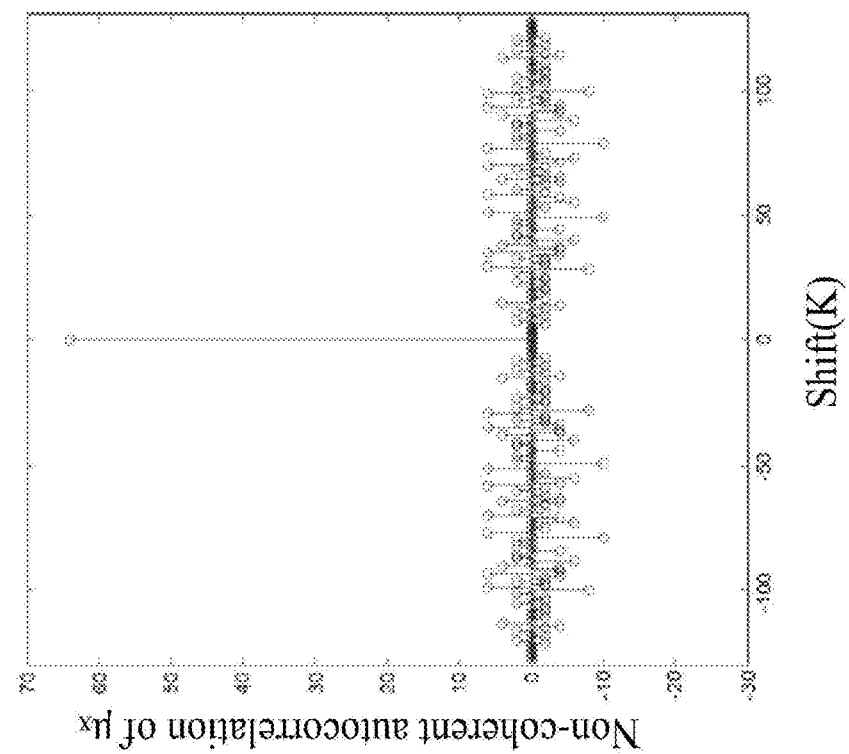
FIGS. 7A and 7B are graphs showing examples of an autocorrelation property of a first base ternary sequence, in accordance with an embodiment.
Figure 7B:
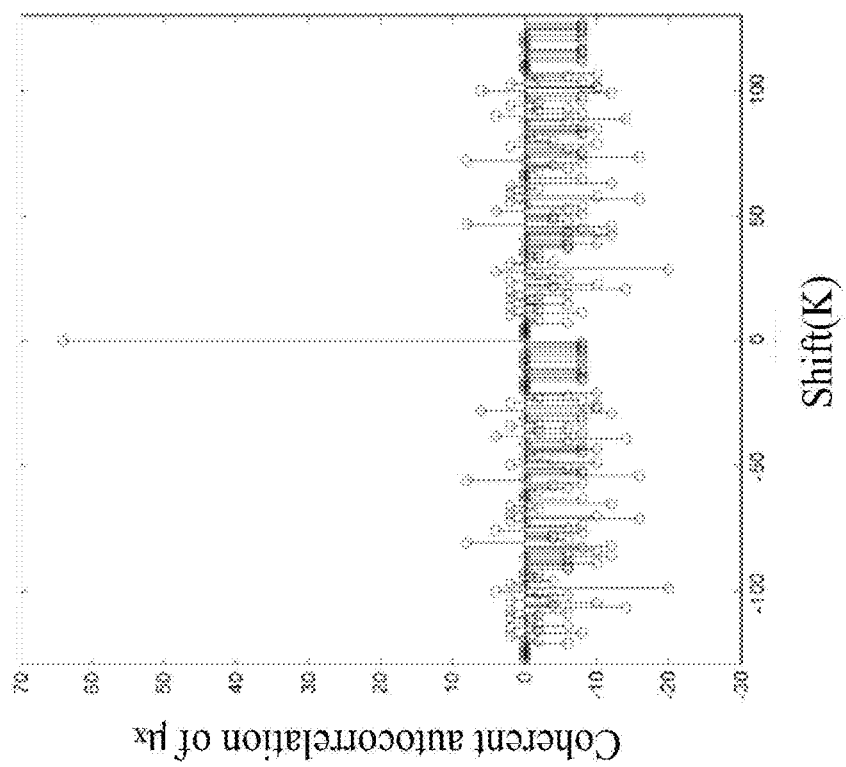

FIGS. 7A and 7B are graphs showing examples of an autocorrelation property of a first base ternary sequence, in accordance with an embodiment. Here, a base ternary sequence of length 128 is selected to demonstrate correlation properties.

Figure 8B:
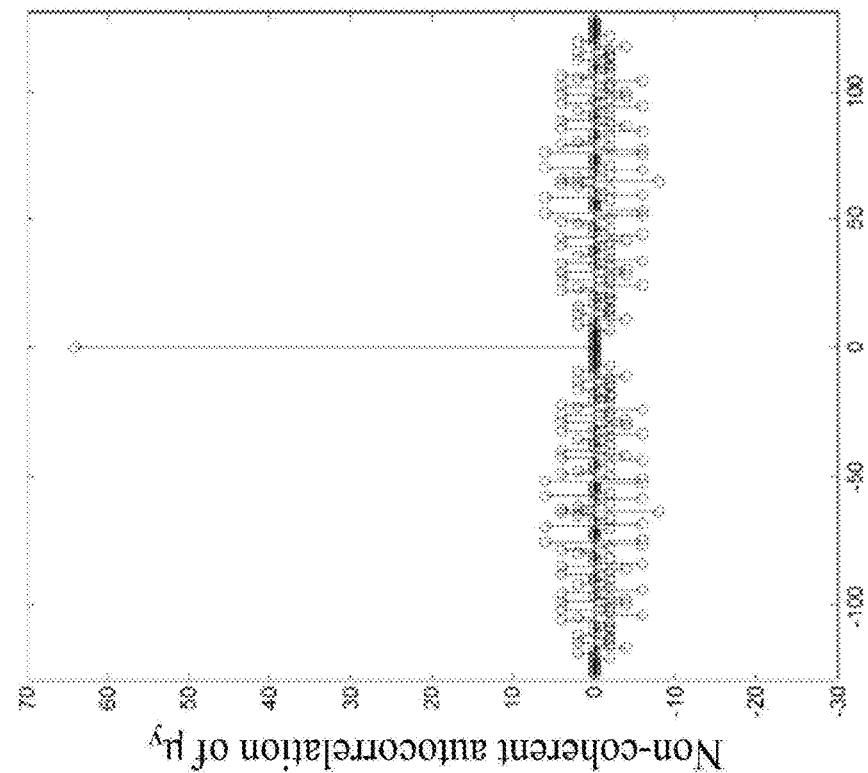
FIGS. 8A and 8B are graphs showing examples of an autocorrelation property of a second base ternary sequence, in accordance with an embodiment.
Figure 8A:
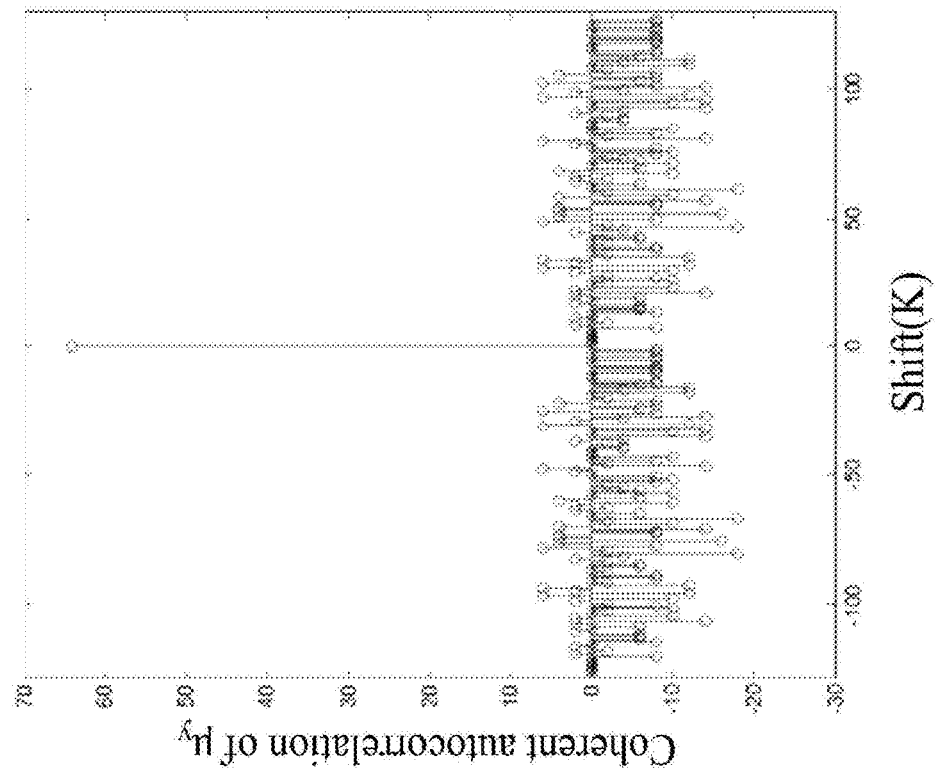

FIGS. 8A and 8B are graphs showing examples of an autocorrelation property of a second base ternary sequence, in accordance with an embodiment. Here, a base ternary sequence of length 128 is selected to demonstrate correlation properties.

Referring to FIGS. 7A and 7B, and FIGS. 8A and 8B, values of out-of-phase autocorrelation are low for sequences in both coherent and non-coherent scenarios.

Figure 9A:
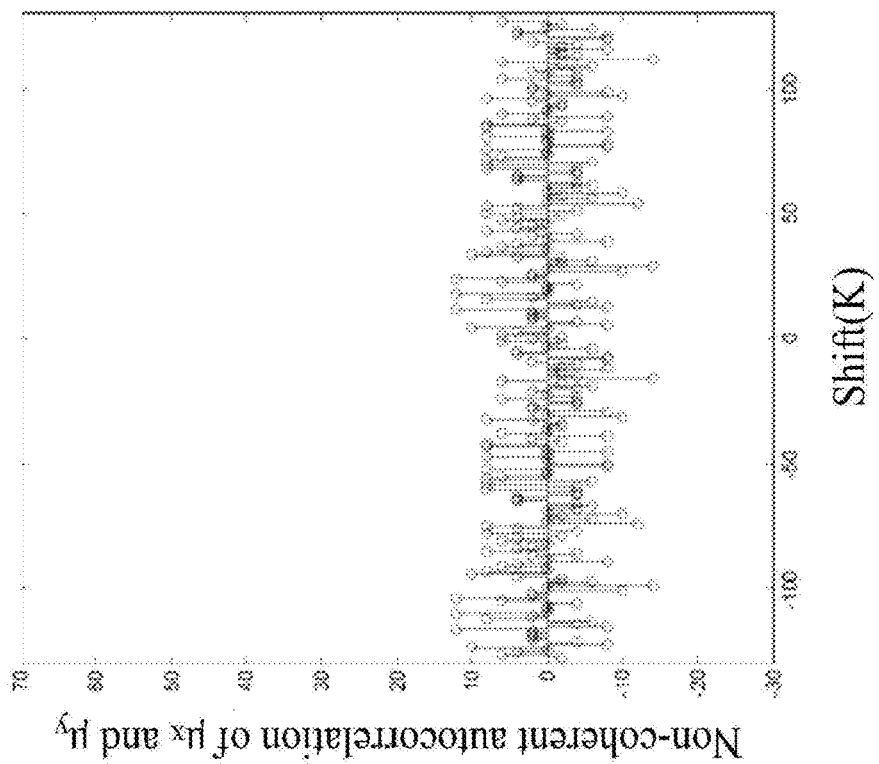
FIGS. 9A and 9B are graphs showing examples of a correlation between a first base ternary sequence and a second base ternary sequence, in accordance with an embodiment.
Figure 9B:
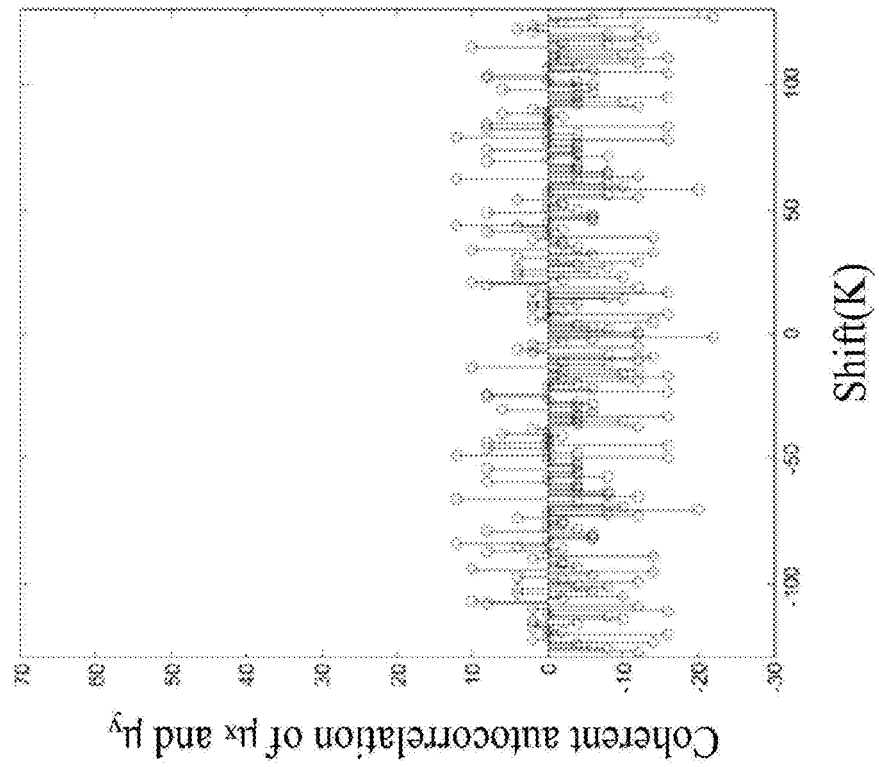

FIGS. 9A and 9B are graphs showing examples of a correlation between a first base ternary sequence and a second ternary sequence, each having a length of 128. Referring to FIGS. 9A and 9B, a cross-correlation between the two sequences is also better for both coherent reception and non-coherent reception.

Table 1 shows sequences $\mu_x$ and $\mu_y$ for periods 8, 32, and 128, according to some examples.

TABLE 1

| N | Ternary sequence $\mu_x$ | Ternary sequence $\mu_y$ |
|---|---|---|
| 8 | 100 0-1110 | 1-1000101 |
| 32 | -100000-1010-1-11011000-11-11100110100 | -100-100-1100000-10110-1010001-1101111 |
| 128 | 1001001-1010011-1-101110000111-1-1-1-10 0011101-100010100101-111-10-10-10-1000 010-1101-111001-1-10010-101100-11000001-10-110-101-110-1000-1-100-1000-10000000 | 11111-1101-1-101-1011-1-10-100010-1100101-1-1-1-1000-10000000-11001-101100011-10011-10-10-11-10000100-1-100000-1010101-1010010010-100-1111001000-11010-10000 |

The sequences presented in Table 1 are used to encode data-symbols for transmission over a wireless channel. Each of the first transmitter 102a and the second transmitter 102b of FIG. 1 selects one of the two sequences in Table 1 and uses each ternary sequence for transmission of information to each receiver, for example, the first coherent receiver 104a, the first non-coherent receiver 104b, the second coherent receiver 104c, and the second non-coherent receiver 104d. Because the respective spreading sequences to encode data-symbols are obtained as cyclic shifts of a single sequence in the following Table 2, a number of distinct spreading sequences is equal to a spreading factor itself. Thus, the spreading sequences of spreading factor M are used to encode data-symbols of size $k=\log_2 M$. For example, spreading sequences of spreading factor M=8 encode data-symbols with size $k=\log_2 8=3$. Similarly, spreading sequences with spreading factors 32 and 128 are used to encode data-symbols of sizes 5 and 7, respectively. Depending on applications, spreading codes are assigned to data-symbols based on any customized logic, for example, grey coding.

In Table 2, an example of assigning spreading codes to data-symbols for k=3 and M=8 is presented. Here, cyclic shifts given to the original sequence are decimal equivalent of a binary data-symbol, which is the one-to-one mapping that determines a cyclic shift of a base ternary sequence for a given data-symbol at transmitters. For example, in Table 2, a cyclic shift is 1 for data-symbol 001. For the method of assigning cyclic shifts of a base ternary sequence to data-symbols some variations may be made.

TABLE 2

| Data-symbol | Cyclic shift (Decimal equivalent) | Base ternary sequence |
|---|---|---|
| 000 | 0 | 1000-1110 |
| 001 | 1 | 01000-111 |
| 010 | 2 | 101000-11 |
| 011 | 3 | 1101000-1 |
| 100 | 4 | -11101000 |
| 101 | 5 | 0-1110100 |
| 110 | 6 | 00-111010 |
| 111 | 7 | 0 00-11101 |

Table 2 is used to obtain the inverse of the one-to-one mapping at receivers. For example, the cyclic shift of 1 determined at any receiver is mapped to the data-symbol 001.

The first transmitter 102a, the second transmitter 102b, the first non-coherent receiver 104b, the first coherent receiver 104a, the second non-coherent receiver 104d, and the second coherent receiver 104c in FIGS. 1 and 2 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3 through 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to transmit independent data by a communication system including one or more processors, a first transmitter, and a second transmitter, the method comprising:

obtaining, using the one or more processors, a first perfect ternary sequence and a second perfect ternary sequence based on a first m-sequence;

obtaining, using the one or more processors, a first base ternary sequence based on the first perfect ternary sequence;

obtaining, using the one or more processors, a second base ternary sequence based on the second perfect ternary sequence;

obtaining, using the one or more processors, a first ternary sequence from the first base ternary sequence corresponding to a first set of data-symbols;

obtaining, using the one or more processors, a second ternary sequence from the second base ternary sequence corresponding to a second set of data-symbols;

transmitting, from the first transmitter, the first ternary sequence to a first set of receivers associated with the first transmitter; and transmitting, from the second transmitter, the second ternary sequence to a second set of receivers associated with the second transmitter.

2. The method of claim 1, wherein the first base ternary sequence comprises a predefined length and retrieved at the first transmitter.

3. The method of claim 1, wherein the second base ternary sequence comprises a predefined length and is retrieved at the second transmitter.

4. The method of claim 1, wherein the first ternary sequence is obtained as a cyclic shift of the first base ternary sequence, and the cyclic shift corresponds to a data-symbol to be transmitted from the first transmitter and is determined based on a one-to-one mapping.

5. The method of claim 1, wherein the second ternary sequence is obtained as a cyclic shift of the second base ternary sequence, and the cyclic shift corresponds to a data-symbol to be transmitted from the second transmitter and is determined based on a one-to-one mapping.

6. The method of claim 1, wherein the first base ternary sequence is generated by:

obtaining the first m-sequence of a period N−1;

obtaining the first perfect ternary sequence from the first m-sequence; and appending a zero to a run of all zeros in the first perfect ternary sequence.

7. The method of claim 1, wherein the second base ternary sequence is generated by:

obtaining a second m-sequence of a period N−1 as a decimation of the first m-sequence used to generate the first ternary sequence;

obtaining the second perfect ternary sequence from the second m-sequence; and appending a zero to a run of all zeros in the second perfect ternary sequence.

8. The method of claim 6, wherein the first perfect ternary sequence is generated from the first m-sequence by:

obtaining a preferred pair of m-sequences from the first m-sequence;

obtaining a first correlation sequence of the preferred pair, the correlation sequence being obtained as a cross-correlation function between two m-sequences of the preferred pair;

obtaining a first offset correlation sequence from the first correlation sequence; and generating the first perfect ternary sequence based on the first offset correlation sequence.

9. The method of claim 7, wherein the second perfect ternary sequence is generated from the second m-sequence by:

obtaining a preferred pair of m-sequences from the second m-sequence;

obtaining a second correlation sequence of the preferred pair, the correlation sequence being obtained as a cross-correlation function between two m-sequences of the preferred pair;

obtaining a second offset correlation sequence from the second correlation sequence; and generating the second perfect ternary sequence based on the second offset correlation sequence.

10. The method of claim 1, wherein the communication system includes the first set of receivers and the second set of receivers, wherein the first set of receivers comprises a first non-coherent receiver and a first coherent receiver associated with the first transmitter, and the second set of receivers comprises a second non-coherent receiver and a second coherent receiver associated with the second transmitter.

11. The method of claim 10, further comprising:

receiving, at the first set of receivers, the first ternary sequence transmitted from the first transmitter;

receiving, at the second set of receivers, the second ternary sequence transmitted from the second transmitter;

demodulating, at the first coherent receiver, the first ternary sequence by correlating the first ternary sequence with all cyclic shifts of a conjugate sequence obtained from the first base ternary sequence; and demodulating, at the first non-coherent receiver, the first ternary sequence by correlating the first ternary sequence with all cyclic shifts of a conjugate sequence obtained from an absolute value of the first base ternary sequence.

12. The method of claim 10, further comprising:

demodulating, at the second coherent receiver, the second ternary sequence by correlating the second ternary sequence with all cyclic shifts of a conjugate sequence obtained from the second base ternary sequence; and demodulating, at the second non-coherent receiver, the second ternary sequence by correlating the second ternary sequence with all cyclic shifts of a conjugate sequence obtained from an absolute value of the second base ternary sequence.

13. The method of claim 4, wherein the communication system includes the first set of receivers and the second set of receivers, the method further comprising:

detecting, at the first set of receivers, a data-symbol transmitted from the first transmitter by identifying a first single cyclic shift corresponding to a maximum correlation value among all cyclic shifts;

detecting, at the second set of receivers, a data-symbol transmitted from the second transmitter by identifying a second single cyclic shift corresponding to the maximum correlation value among all cyclic shifts;

obtaining, at the first set of receivers, each of the data-symbols corresponding to the first transmitter from the first single cyclic shift using an inverse of the one-to-one mapping; and obtaining, at the second set of receivers, each of the data-symbols corresponding to the second transmitter from the second single cyclic shift using the inverse of the one-to-one mapping.

14. The method of claim 11, wherein the conjugate sequence is obtained by replacing numeric '0' with numeric '−1' in the first base ternary sequence.

15. The method of claim 11, wherein the absolute value of the first base ternary sequence and an absolute value of the second base ternary sequence are obtained by replacing numeric '−1' of the first base ternary sequence and by replacing numeric '−1' of the second base ternary sequence with numeric '1'.

16. The method of claim 1, wherein data to be transmitted is divided into the first set of data-symbols with a predefined length and the second set of data-symbols with the predefined length.

17. A system for transmitting independent data, comprising:

one or more processors configured to:

obtain, using the one or more processors, a first perfect ternary sequence and a second perfect ternary sequence based on a first m-sequence;

obtain, using the one or more processors, a first base ternary sequence based on the first perfect ternary sequence;

obtain, using the one or more processors, a second base ternary sequence based on the second perfect ternary sequence;

obtain a first ternary sequence from a first base ternary sequence corresponding to a first set of data-symbols; and obtain a second ternary sequence from a second base ternary sequence corresponding to a second set of data-symbols;

a first transmitter configured to transmit the first ternary sequence to a first set of receivers associated with the first transmitter; and a second transmitter configured to transmit the second ternary sequence to a second set of receivers associated with the second transmitter.

18. The system of claim 17, wherein the first base ternary sequence comprises a predefined length retrieved at the first transmitter.

19. The system of claim 17, wherein the second base ternary sequence comprises the predefined length retrieved at the second transmitter.

20. The system of claim 17, wherein the first ternary sequence is obtained as a cyclic shift of the first base ternary sequence, and the cyclic shift corresponds to a data-symbol to be transmitted from the first transmitter and is determined based on a one-to-one mapping.

21. The system of claim 17, wherein the second ternary sequence is obtained as a cyclic shift of the second base ternary sequence, and the cyclic shift corresponds to a data-symbol to be transmitted from the second transmitter and is determined based on a one-to-one mapping.

22. The system of claim 17, wherein the first base ternary sequence is generated by obtaining the first m-sequence of a period N−1, obtaining the first perfect ternary sequence from the first m-sequence, and appending a zero to a run of all zeros in the first perfect ternary sequence.

23. The system of claim 17, wherein:
the second base ternary sequence is generated by obtaining a second m-sequence of a period N−1 as a decimation of the first m-sequence used to generate the first ternary sequence, obtaining the second perfect ternary sequence from the second m-sequence, and appending a zero to a run of all zeros in the second perfect ternary sequence.

24. The system of claim 22, wherein the first perfect ternary sequence is generated from the first m-sequence by obtaining a preferred pair of m-sequences from the first m-sequence, obtaining a first correlation sequence of the preferred pair, the correlation sequence being obtained as a cross-correlation function between two m-sequences of the preferred pair, obtaining a first offset correlation sequence from the first correlation sequence, and generating the first perfect ternary sequence based on the first offset correlation sequence.

25. The system of claim 23, wherein the second perfect ternary sequence is generated from the second m-sequence by obtaining a preferred pair of m-sequences from the second m-sequence, obtaining a second correlation sequence of the preferred pair, the correlation sequence being obtained as a cross-correlation function between two m-sequences of the preferred pair, obtaining a second offset correlation sequence from the second correlation sequence, and generating the second perfect ternary sequence based on the second offset correlation sequence.

26. The system of claim 17, wherein the system further includes the first set of receivers and the second set of receivers,
wherein the first set of receivers comprises a first non-coherent receiver and a first coherent receiver associated with the first transmitter, and
the second set of receivers comprises a second non-coherent receiver and a second coherent receiver associated with the second transmitter.

27. The system of claim 26, wherein the system is further configured to
receive, using the first set of receivers, the first ternary sequence transmitted from the first transmitter,
receive, using the second set of receivers, the second ternary sequence transmitted from the second transmitter,
demodulate, using the first coherent receiver, the first ternary sequence by correlating the first ternary sequence with all cyclic shifts of a conjugate sequence obtained from the first base ternary sequence, and
demodulate, using the first non-coherent receiver, the first ternary sequence by correlating the first ternary sequence with all cyclic shifts of a conjugate sequence obtained from an absolute value of the first base ternary sequence.

28. The system of claim 26, wherein the system is further configured to:
demodulate, using the second coherent receiver, the second ternary sequence by correlating the second ternary sequence with all cyclic shifts of a conjugate sequence obtained from the second base ternary sequence, and
demodulate, using the second non-coherent receiver, the second ternary sequence by correlating the second ternary sequence with all cyclic shifts of a conjugate sequence obtained from an absolute value of the second base ternary sequence.

29. The system of claim 20, wherein the system further includes the first set of receivers and the second set of receivers,
wherein the system is further configured to:
detect, using the first set of receivers, a data-symbol transmitted from the first transmitter by identifying a first single cyclic shift corresponding to a maximum correlation value among all cyclic shifts,
detect, using the second set of receivers, a data-symbol transmitted from the second transmitter by identifying a second single cyclic shift corresponding to the maximum correlation value among all cyclic shifts,
obtain, using the first set of receivers, each of the data-symbols corresponding to the first transmitter from the first single cyclic shift, and
obtain, using the second set of receivers, each of the data-symbols corresponding to the second transmitter from the second single cyclic shift using an inverse of the one-to-one mapping.

30. The system of claim 27, wherein the conjugate sequence is obtained by replacing numeric '0' with numeric '−1' in the first base ternary sequence.

31. The system of claim 27, wherein the absolute value of the first base ternary sequence and an absolute value of the second base ternary sequence are obtained by replacing numeric '−1' of the first base ternary sequence and by replacing numeric '−1' of the second base ternary sequence with numeric '1'.

32. The system of claim 17, wherein data to be transmitted is divided into the first set of data-symbols with a predefined length and the second set of data-symbols with the predefined length.

33. A method to receive independent data, the method comprising:
a first coherent receiver configured to demodulate a first ternary sequence received from a first transmitter by correlating the first ternary sequence with all cyclic shifts of a conjugate sequence obtained from a first base ternary sequence corresponding to a first set of data-symbols;
a first non-coherent receiver configured to demodulate the first ternary sequence by correlating the first ternary sequence with all cyclic shifts of a conjugate sequence obtained from an absolute value of the first base ternary sequence;
a second coherent receiver configured to demodulate a second ternary sequence received from a second transmitter by correlating the second ternary sequence with all cyclic shifts of a conjugate sequence obtained from a second base ternary sequence corresponding to a second set of data-symbols; and
a second non-coherent receiver configured to demodulate the second ternary sequence by correlating the second ternary sequence with all cyclic shifts of a conjugate sequence obtained from an absolute value of the second base ternary sequence.

34. The method of claim 33, wherein the first set of data-symbols is detected by identifying a first single cyclic shift corresponding to a maximum correlation value among all of the cyclic shifts of the conjugate sequence obtained from the first base ternary sequence.

35. The method of claim 33, wherein the second set of data-symbols is detected by identifying a second single cyclic shift corresponding to a maximum correlation value among all of the cyclic shifts of the conjugate sequence obtained from the second base ternary sequence.

36. The method of claim 33, wherein the first set of data-symbols comprises a first predefined length and the second set of data-symbols comprises a second predefined length.

* * * * *